Patented June 6, 1944

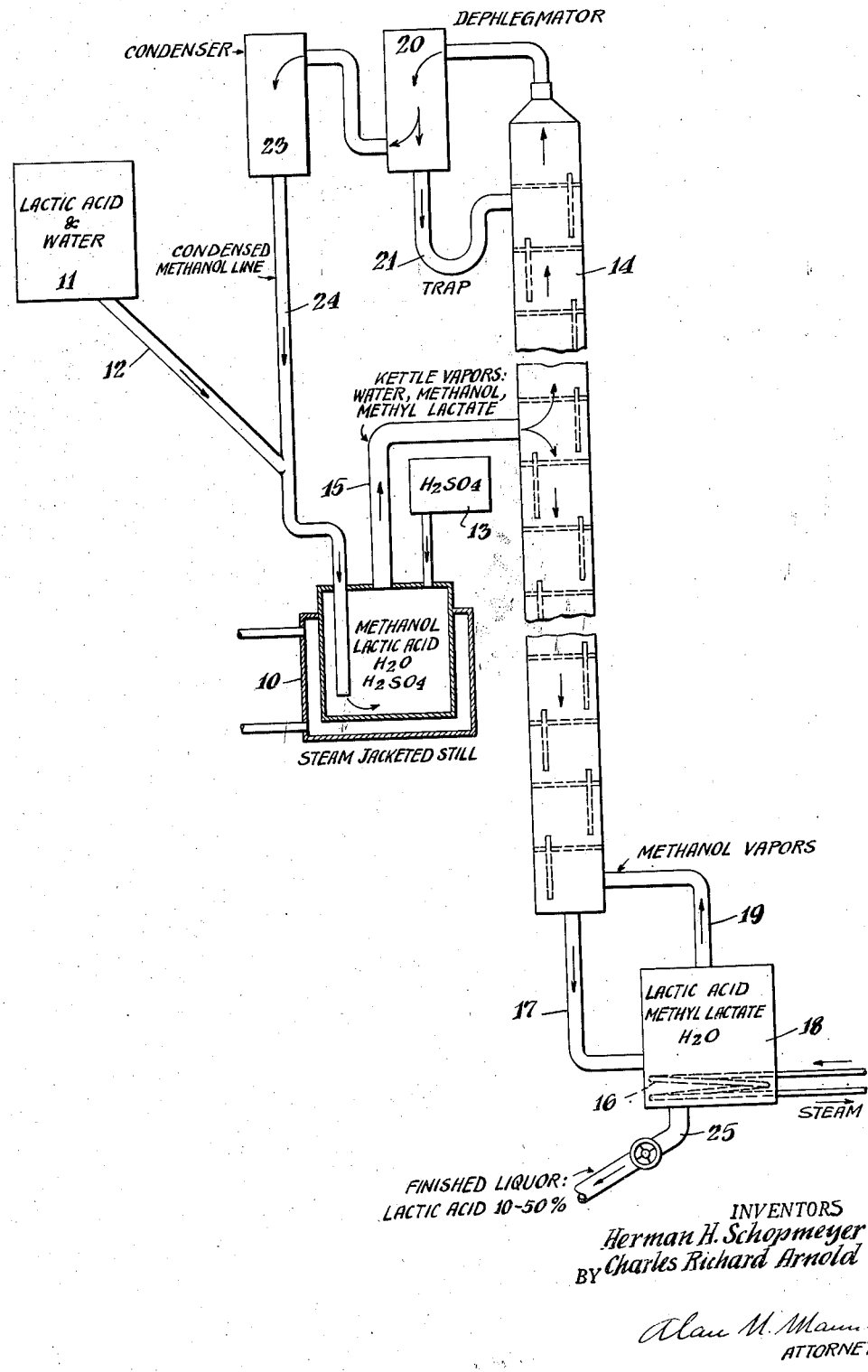

2,350,370

UNITED STATES PATENT OFFICE 2,350,370

LACTIC ACID PURIFICATION

Herman H. Schopmeyer, Hammond, and Charles R. Arnold, Munster, Ind., assignors to American Maize-Products Company, a corporation of Maine Application February 16, 1943, Serial No. 476,060

8 Claims. (Cl. 260—535)

This invention relates to the purification of lactic acid. It relates particularly to a convenient and effective method for separating lactic acid in purified condition from an aqueous mixture such as is produced by the usual process including lactic fermentation of a carbohydrate, neutralizing the resulting lactic acid with finely divided calcium carbonate to form calcium lactate, treating a concentrated solution of the calcium lactate with aqueous sulfuric acid to precipitate calcium sulfate and then separating the calcium sulfate from the liquor constituting the aqueous lactic acid solution to be purified.

Such lactic acid solution includes various impurities, an important one of which is unfermented carbohydrate material.

One process for the separation of lactic acid from such a mixture involves esterifying with methanol or other alcohol, distilling off the ester, hydrolyzing the ester of free acid, and then separating the alcohol. Difficulty arises in that, at the temperature of distillation of the lactic acid ester, there is produced an objectionable amount of hydroxymethylfurfural or other undesired products. Some of these are volatile, distil with the lactic acid ester, and lower the quality of the finished acid which is obtained by hydrolysis of the distilled ester and removal of the alcohol so liberated.

To decrease somewhat this objection to the ester distillation method and to decrease losses of lactic acid due to decomposition in the presence of the acidic catalyst of esterification, vacuum distillation may be used. For satisfactory economical operation, however, fractionation must be used and vacuum fractionating equipment for large production must be of impracticable size because of the extremely great volume of vapors when under a good vacuum as compared to the volume of the same vapors at atmospheric pressure.

The present invention provides a method which overcomes the objection to the vacuum distillation of the esters and also makes possible the continous esterification, distillation and fractionation of the resulting ester of lactic acid, hydrolysis of the ester in a fractionating column, removal of the fractionated vapor of the alcohol produced by the hydrolysis and return of it to the esterification, and separation of a purified aqueous solution of the lactic acid from the lower end of the fractionating equipment.

The invention comprises heating an esterification mixture of an aqueous solution of the lactic acid to be purified, a relatively low boiling aliphatic alcohol, and an acidic catalyst of esterification, delivering to a fractionating column the mixture of vapors produced by heating the esterification mixture, withdrawing fractionated alcohol vapor from the top of the column, condensing the withdrawn vapor, returning a portion at least of the condensed alcohol to the esterification, and withdrawing purified lactic acid solution from the fractioning equipment, advantageously from the lower part thereof, the lactic acid ester in the treatment described undergoing substantially complete hydrolysis to give free alcohol and free lactic acid which are separately removed from the column in the manner stated. In a preferred practice of the invention, the condensed alcohol to be returned to the esterification is first blended with a fresh supply of the aqueous lactic acid solution to be purified, so that the alcohol in concentrated form does not contact the hot esterification mixture and is thus prevented from quick evaporation before thorough mixing, sometimes herein referred to for convenience as flashing or flash evaporation.

The process gives a good yield of lactic acid in the form of a purified aqueous solution. The process makes possible the use of dilute lactic acid solutions for esterification with an excellent yield of the recovered lactic acid, is convenient, continuous, economical, and easy to control. It reduces to a negligible minimum the decomposition of lactic acid during the distillation and the formation of contaminating volatile by-products from sugar and other impurities present in the crude lactic acid solution originally used.

The lactic acid to be purified is suitably in the form of a solution resulting from liberation of the lactic acid from calcium lactate and filtering out the resulting calcium sulfate, in the usual commercial process for the manufacture of lactic acid by fermentation. The lactic acid may be in any concentration that is usual in aqueous solutions of crude lactic acid requiring purification but ordinarily is of concentration about 40% to 60%.

As the alcohol used there is selected one that is low boiling and preferably an aliphatic alcohol containing not more than 3 carbon atoms to the molecule. The alcohol used should be soluble to a large extent in water and either primary or secondary, a primary alcohol being preferred. Examples of satisfactory alcohols are methyl, ethyl, propyl, and isopropyl. Secondary butyl or normal butyl may be used but are not as satisfactory because of the limited solubility of those alcohols in water. Methyl alcohol is particularly satisfactory. We have found that its lactic acid ester and water form a binary azeotropic mixture of minimum boiling point, boiling at approximately 209° to 210° F. and containing approximately 20 parts of methyl lactate to 80 of water.

As the catalyst, sulfuric acid is satisfactory and is preferred. Hydrochloric acid may be used although there is some inconvenience due to the volatilization of a trace of the acid in the operation described when the acid used is hydrochloric. Another acid that may be used but which involves unnecessary expense over the use of sulfuric acid is phosphoric acid. If used, phosphoric acid should be present in proportion several times that of the sulfuric acid so as to give about the same pH in the esterification mixture as is given by the smaller proportion of sulfuric acid.

The rate of feed of the lactic acid and water solution to the esterification vessel and the return of the recovered alcohol to the reaction are so controlled that there is at all times an excess of the alcohol over the proportion required theoretically to esterify the lactic acid in the mixture undergoing esterification.

Also, the rate of feeding of the lactic acid and water solution and the rate of distillation are so controlled that the esterification mixture contains approximately 10 to 20 parts of water for 100 parts of the total mixture. Proportions of water somewhat outside this range may be used. With much higher proportions of water, however, the capacity of the still in amount of lactic acid purified per hour is reduced. With much lower concentrations of water than 10%, objectionable proportions of decomposition products are formed.

Further details of our process and the equipment for carrying it out will be understood from the following description taken in conjunction with the accompanying drawing which illustrates the preferred embodiment of the invention. The drawing shows diagrammatically the system layout and order of steps of the process to effect continuous esterification, distillation of the resulting ester, hydrolysis of the ester into purified lactic acid and alcohol, and separation of the hydrolysis products from each other.

At the starting of the operation, methanol and 80% lactic acid, together with a small amount of sulfuric acid as catalyst, are charged into an esterification kettle 10. This kettle is heated as by a steam jacket. The ingredients in the esterification mixture in the kettle 10 are suitably present approximately in the proportion of 1.5 mols of methyl alcohol, 1 mol of lactic acid and 0.005 mol of sulfuric acid, the latter being supplied from storage 13. This mixture is refluxed for about 2 to 3 hours to permit considerable of the lactic acid ester to form in the kettle 10.

Then the aqueous solution of the lactic acid to be purified, in concentration of about 40% to 60% acid, is fed continuously from a reservoir 11 through pipe 12 in the reaction kettle 10. In a commercially advantageous practice, the lactic acid and water are supplied to the reaction kettle in sufficient amount to balance the rate of distillation, so as to maintain the mixture in the still 10 at about a constant level as the distillation proceeds and of composition about 25-35% lactic acid, 10-20% alcohol, 30-40% methyl lactate and 10-20% water.

The water present in the lactic acid which is used, together with the water formed by the esterification reaction in the still 10 are vaporized by the heating along with the methyl lactate ester and some of the unreacted methyl alcohol. The vapors are passed through conduit 15 into a fractionating column 14 at an intermediate level therein and suitably near the middle of the column from top to bottom. The vapors conducted into the fractionating column 14 in a typical operation have approximately the following composition: 55% alcohol, 20% methyl lactate, 25% water, and a trace of acid, all proportions here and elsewhere herein being expressed as parts by weight unless otherwise specifically stated.

Methyl alcohol vapors rise in the column 14, are fractionated, removed from the top of the column, condensed, and returned in part at least to the reaction kettle 10 as explained more in detail below.

At the temperature of the column, the lactic acid ester undergoes hydrolysis. It is in equilibrium, therefore, with the free alcohol of kind originally used and lactic acid. As the equilibrium is disturbed by the fractionation out of the alcohol, the hydrolysis proceeds in the effort to restore the alcohol to the equilibrium concentration. As fractionation is continued, the hydrolysis becomes practically complete, at a position near the bottom of the column or in the separate boiling kettle 18, the position at which the hydrolysis becomes substantially complete varying with the height and effectiveness of the fractionating column and other operating conditions.

The aqueous solution of purified lactic acid, which works downward to the bottom of the column, passes over heating elements 16 and then to the valved draw off 25 for purified lactic acid. The heat from elements 16, such as steam coils, is supplied to the column at a position near the bottom thereof, vapors entering the column through pipe 19. Due to this heat and the temperature of the vapors from still 10, the liquid in the fractionating column at each level in the column is maintained approximately at the boiling point of the composition at that level in accordance with fractionation technique, once the column has been placed in smooth operation.

The lactic acid thus purified is drawn off from the still and sent to an evaporator for concentration to the desired strength, say from 10% to 50% concentration at the draw off 25 to 80% or so after concentration.

The methyl alcohol which is vaporized in the column is conducted to a reflux condenser or dephlegmator 20 which returns a portion of the condensate through the trapped conduit 21 into the column 14 as a reflux.

The methyl alcohol vapors that are not condensed for use as the reflux continue through into the second condenser 23. The condensate passes through the return line 24 which, suitably, joins the feed line 12.

In this way the alcohol being returned to the system is diluted by being mixed with a fresh supply of the unpurified lactic acid solution before the alcohol strikes the hot mixture in the esterification kettle 10. This avoids flashing, to which there is a definite tendency if the volatile alcohol in undiluted form is conducted back to the esterification vessel 10.

As will be appreciated from the foregoing description and reference to the flow diagram of the drawing, it is possible by our invention to esterify methyl or other selected low boiling aliphatic alcohol with lactic acid so as to form a lactate ester in the presence of a large amount of water, to remove the ester from the reaction mixture constantly by distilling it along with some unreacted alcohol and water, to reuse the alcohol resulting from the hydrolysis of the ester continuously and thereby maintain a minimum amount of methyl alcohol in the system, and to introduce dilute lactic acid in the reaction mixture as required to maintain a consistent rate of ester production.

The yields are excellent. By feeding in fresh aqueous acid constantly and controlling the temperature in the kettle, with the fresh acid, water and methyl alcohol, decomposition in the kettle is prevented.

The process is continuous. It may be and is carried on almost indefinitely. Only after long operation does the residue of unfermented material, salts, etc., from the crude acid fed accumulate in the kettle to such an extent that the operation must be stopped. When the process is stopped, the acid in the kettle plus the acid distilled over will account for substantially all the acid fed in.

It will be understood that it is intended to cover all changes and modifications of the example of the invention herein chosen for the purpose of illustration which do not constitute departures from the spirit and scope and the invention.

What is claimed is:

1. In making a purified lactic acid by a process involving separation of lactic acid from impurities therein at approximately atmospheric pressure, at a temperature not substantially above the boiling point of water, and with minimized production of volatile products from the impurities present, the method which comprises continuously forming an esterification mixture including an aqueous solution of the lactic acid to be purified, a low boiling aliphatic alcohol, water, and an acidic catalyst of esterification, heating the mixture to promote the formation of the lactic acid ester of the said alcohol, continuously distilling from the esterification mixture a vapor containing the said ester, alcohol, and water, delivering the vapor to a fractionating column, fractionating the alcohol from the mixture delivered to the column and removing the fractionated alcohol vapor from the upper end of the fractionation equipment, then condensing the fractionated vapor of the alcohol, returning a portion at least of the condensed alcohol to the esterification mixture, supplying heat at a position near the lower end of the fractionating column to the higher boiling material that accumulates there, so that the liquid in the column is maintained at approximately the boiling point at each level in the column, and withdrawing an aqueous solution of purified lactic acid at a point below that of the said position of supplying heat near the bottom of the column, the lactic acid ester in the column undergoing hydrolysis and the free alcohol resulting from the hydrolysis passing upwardly and out of the column.

2. In making a purified lactic acid by a process involving separation of lactic acid from impurities therein at approximately atmospheric pressure, at a temperature not substantially above the boiling point of water, and with minimized production of volatile products from the impurities present, the method which comprises continuously forming an esterification mixture including an aqueous solution of the lactic acid to be purified, a low boiling aliphatic alcohol, water, and an acidic catalyst of esterification, heating the mixture to promote the formation of the lactic acid ester of the said alcohol, continuously distilling from the esterification mixture a vapor containing the said ester, alcohol, and water, delivering the vapor to a fractionating column at an intermediate level therein, fractionating the alcohol from the mixture delivered to the column and removing the fractionated alcohol vapor from the upper end of the fractionation equipment, then condensing the fractionated vapor of the alcohol, returning a portion at least of the condensed alcohol to the esterification mixture, causing the higher boiling material of the said vapor mixture delivered to the fractionating column to flow downwardly in the column, supplying heat at a position near the lower end of the fractionating column to the higher boiling material that accumulates there, so that the liquid in the column is maintained at approximately the boiling point at each level in the column, and withdrawing an aqueous solution of purified lactic acid at a point below that of the said position of supplying heat near the bottom of the column, the lactic acid ester in the column undergoing hydrolysis, the free alcohol resulting from the hydrolysis passing upwardly and out of the column and the resulting aqueous solution of lactic acid passing downwardly to the draw off position of lactic acid.

3. The method described in claim 1, the alcohol used being a primary alcohol containing not substantially more than 3 carbon atoms to the molecule.

4. The method described in claim 1, the said portion of the condensed alcohol being mixed with a fresh portion of the aqueous solution of the lactic acid to be purified, so that flashing of the alcohol in contact with the heated esterification mixture is prevented.

5. A continuous process for making purified lactic acid comprising the continuous steps of esterifying lactic acid in a relatively dilute aqueous solution of the lactic acid, a water-soluble aliphatic alcohol, and an added acid catalyst of esterification, distilling from the reacted mixture vapor of alcohol, lactic acid ester and water, fractionating the alcohol from the water and lactic acid ester and at the same time hydrolyzing the lactic acid ester, without the addition of any extraneous acid and at approximately atmospheric pressure, into lactic acid and additional alcohol, and fractionating out the additional alcohol as liberated, condensing the fractionated alcohol, and recycling the condensed alcohol in part at least to the esterification reaction mixture.

6. The process described in claim 5, the alcohol used being methyl.

7. A process as defined in claim 5 in which the proportion of water in the esterification mixture is maintained at all times at about 10% to 20% of the total weight of the esterification mixture.

8. The method described in claim 2, the alcohol used being methanol and the vapor continuously distilled from the esterification mixture being an azeotropic mixture consisting of approximately 20 parts of methyl lactate to 80 of water and distilling at a constant temperature of about 209° F.

HERMAN H. SCHOPMEYER.
CHARLES R. ARNOLD.

CERTIFICATE OF CORRECTION.

Patent No. 2,350,370.　　　　　　　　　　　　　　　　　　　June 6, 1944.

HERMAN H. SCHOPMEYER, ET AL

It is hereby certified that error appears in the printed specification of the above numbered patent requiring correction as follows: Page 1, first column, line 20, for the word "of" before "free" read --to--; and that the said Letters Patent should be read with this correction therein that the same may conform to the record of the case in the Patent Office.

Signed and sealed this 31st day of October, A. D. 1944.

(Seal)　　　　　　　　　　　　　　　　　　　　　　　Leslie Frazer
　　　　　　　　　　　　　　　　　　　　　　Acting Commissioner of Patents.